J. STRUKELJ.
DETACHABLE STEERING WHEEL.
APPLICATION FILED SEPT. 18, 1919.

1,334,417.

Patented Mar. 23, 1920.

WITNESSES
Guy M. Spring
S. M. McColl

JACOB STRUKELJ, Inventor

By Richard B. Owen,
Attorney

UNITED STATES PATENT OFFICE.

JACOB STRUKELJ, OF McDOWELL, WEST VIRGINIA.

DETACHABLE STEERING-WHEEL.

1,334,417.    Specification of Letters Patent.    Patented Mar. 23, 1920.

Application filed September 18, 1919. Serial No. 324,270.

*To all whom it may concern:*

Be it known that I, JACOB STRUKELJ, a citizen of Yugoslav, residing at McDowell, in the county of McDowell and State of West Virginia, U. S. A., have invented certain new and useful Improvements in Detachable Steering-Wheels, of which the following is a specification.

This invention relates to steering wheels for motor vehicles.

The object of the invention is to provide a detachable steering wheel connected so as to be quickly removed and applied to avoid unauthorized persons from using or stealing the vehicle in connection with which it is used.

Another object is to provide a steering wheel having spokes removably connected with the wheel rim and with its hub, so that the driver when parking his vehicle, may take out the spokes and put them in his pocket so that the vehicle cannot be steered until the spokes are replaced or a new wheel applied.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
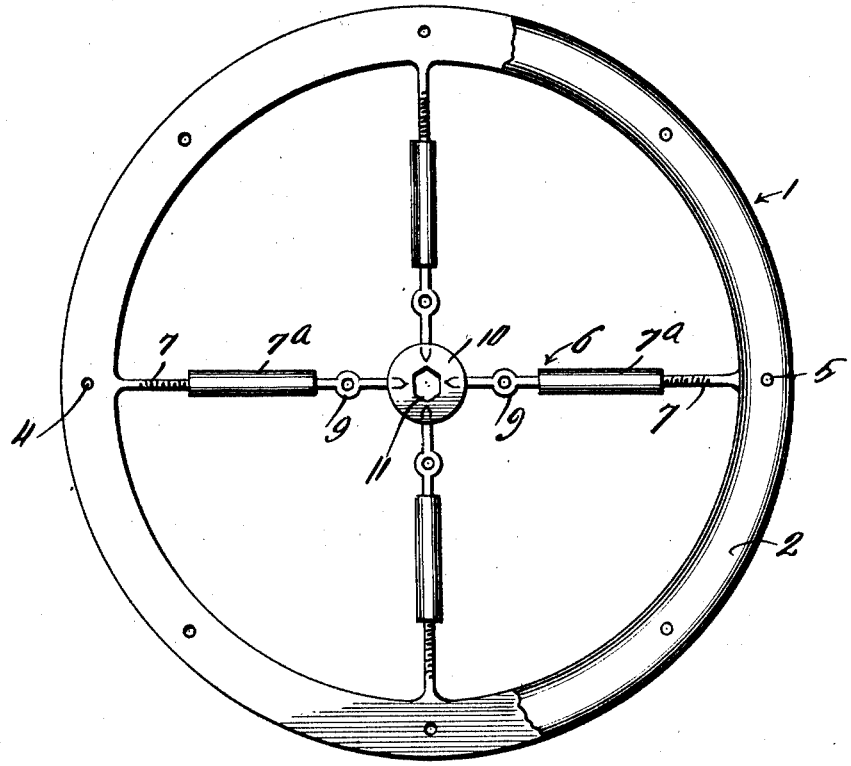
Figure 2:

Figure 1 represents a top plan view of a wheel constructed in accordance with this invention with parts of the rim broken out, and Fig. 2 is a central transverse section thereof.

In the embodiment illustrated, the steering wheel 1 constituting this invention comprises the usual rim 2 composed of sections 3 made of wood or other suitable material having a flat annular plate 3ª secured between the wooden sections, said plate having apertures 4 to receive rivets or bolts 5 which pass through the wooden sections and said plate to securely hold them together.

The rim 2 is connected with the hub 10 by means of spokes 6. These spokes 6, four of which are here shown, are each constructed in sections 7 and 7ª, the section 7ª being shown made integral with plate 3ª and radiating inward from its inner edge. These fixed sections 7 are threaded and adapted to adjustably engage sockets 8 formed on the removable or detachable portion 7ª of the spoke. The detachable portion 7ª has a shank 8ª which is pointed at its free end to enter peripheral sockets formed in the hub 10. These members 8ª also have eyes 9 formed therein for the reception of a pin or other tool to be used in screwing the sections together or for unscrewing them.

The hub 10 has a central opening 11 which is designed to fit on the annular portion of the steering post, the wheel being held engaged with said post by the usual nut, not shown.

After the wheel has been placed on the post and secured by the nut, as above set forth, the parts will be normally as shown in Figs. 1 and 2. When the operator or driver desires to park his vehicle and avoid all danger of its being stolen, he simply unscrews the sections 7ª by placing a pin through the openings or eyes 9 in the shanks thereof and turning it in the proper direction. These spokes may be placed in his pocket or elsewhere as may be desired. It will of course be understood, that when the spokes are removed, the wheel is rendered useless, and the steering post cannot be operated without replacing the spokes or applying another wheel thereto.

From the foregoing description, taken in connection with the accompanying drawing, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

1. A steering wheel for motor vehicles comprising a rim, having spoke sections radiating inwardly from its inner edge, a centrally disposed hub, and removable spoke sections having threaded engagement with said fixed sections, and detachably connected with said hub.

2. A steering wheel for motor vehicles comprising a rim having fixed spoke sections extending inwardly and radially therefrom, said sections being threaded, a hub having peripheral sockets, detachable spoke sections having internally threaded sockets at one end to receive the threaded ends of the fixed spoke sections, and shanks extending from said sockets with their free ends entering the sockets of said hub.

3. A steering wheel for motor vehicles comprising a hub, a rim, and spokes, said spokes being made in sections, one of said sections being fixed to one member of the wheel and the other detachably connected with said hub and provided with a pin receiving eye, said sections having coöperating means for adjustably and detachably connecting them.

In testimony whereof I affix my signature in presence of two witnesses.

JACOB STRUKELJ.

Witnesses:
C. M. ARMBRISTER,
W. W. WATKINS.